(12) United States Patent
Matsuura

(10) Patent No.: US 11,320,354 B2
(45) Date of Patent: May 3, 2022

(54) MATERIAL TESTER AND NATURAL VIBRATION DETERMINATION-NOISE ELIMINATION THEREOF

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 248 days.

(21) Appl. No.: 16/242,005

(22) Filed: Jan. 8, 2019

(65) Prior Publication Data

US 2019/0234849 A1 Aug. 1, 2019

(30) Foreign Application Priority Data

Feb. 1, 2018 (JP) .............................. JP2018-016578

(51) Int. Cl.
*G01N 3/62* (2006.01)
*G01L 1/10* (2006.01)
(Continued)

(52) U.S. Cl.
CPC ................ *G01N 3/62* (2013.01); *G01L 1/103* (2013.01); *G01N 3/08* (2013.01); *G01N 3/30* (2013.01); *G01N 2203/001* (2013.01); *G01N 2203/0003* (2013.01); *G01N 2203/0012* (2013.01); *G01N 2203/0017* (2013.01);
(Continued)

(58) Field of Classification Search
CPC .. G01L 1/103; G01N 3/30; G01N 2203/0218; G01N 29/12
See application file for complete search history.

(56) References Cited

U.S. PATENT DOCUMENTS

2016/0084802 A1* 3/2016 Yusuf .................. G01N 29/045
73/582

FOREIGN PATENT DOCUMENTS

| JP | 2004333143 | | 11/2004 | |
| JP | 2004333221 | | 11/2004 | |
| JP | 2014109528 | * | 6/2014 | .............. G01M 7/00 |

OTHER PUBLICATIONS

Zhu, Modal Analysis of a Servo-Hydraulic High Speed Machine and its Application to Dynamic Tensile Testing at an Intermediate Strain Rate, 2010, Society of Experimental Mechanics, p. 1347-1363 (Year: 2010).*

(Continued)

*Primary Examiner* — Eric S. McCall
*Assistant Examiner* — Timothy P Graves
(74) *Attorney, Agent, or Firm* — JCIPRNET

(57) ABSTRACT

An amplitude detecting method and a material tester are provided. As functional blocks of a program that is installed in a personal computer and is stored in a memory, a measurement noise eliminating part that eliminates measurement noise, a vibration noise eliminating part that eliminates vibration noise assumed to be caused by an inertial force according to a natural vibration according to reach of an impact of breakage or destruction of a test piece at the entire tester, an amplitude detecting part that detects the amplitude of a natural vibration superimposed in the data period used for evaluating material characteristics, and a display control part that controls display of an amplitude value of the natural vibration and a test result on the display device are included.

10 Claims, 8 Drawing Sheets

(51) Int. Cl.
G01N 3/30 (2006.01)
G01N 3/08 (2006.01)

(52) U.S. Cl.
CPC ............... G01N 2203/021 (2013.01); G01N 2203/0218 (2013.01); G01N 2203/0252 (2013.01); G01N 2203/0268 (2013.01)

(56) References Cited

OTHER PUBLICATIONS

Roebuck (Load Cell ringing in High Rate Compression Tests, 2004, Applied Mechanics and Materials, Abstract) (Year: 2004).*
"Search Report of Europe Counterpart Application", dated Jul. 4, 2019, p. 1-p. 13.
Xinran Xiao, "Dynamic tensile testing of plastic materials," Polymer Testing, vol. 27, Sep. 2007, pp. 164-178.
H. Huh, et al., "Standard Uncertainty Evaluation for Dynamic Tensile Properties of Auto-Body Steel-Sheets," Experimental Mechanics, vol. 54, Mar. 2014, pp. 943-956.
D. Zhu, et al., "Modal Analysis of a Servo-Hydraulic High Speed Machine and its Application to Dynamic Tensile Testing at an Intermediate Strain Rate," Experimental Mechanics, vol. 51, Dec. 2010, pp. 1347-1363.
Office Action of Japan Counterpart Application, with English translation thereof, dated Jun. 8, 2021, pp. 1-8.

\* cited by examiner

11,320,354 B2

MATERIAL TESTER AND NATURAL VIBRATION DETERMINATION-NOISE ELIMINATION THEREOF

CROSS-REFERENCE TO RELATED APPLICATION

This application claims the priority of Japan patent application serial no. 2018-016578, filed on Feb. 1, 2018. The entirety of the above-mentioned patent application is hereby incorporated by reference herein and made a part of this specification.

BACKGROUND

Technical Field

The disclosure relates to a test result evaluating method for evaluating the reliability of a test result in a material test applying a test force to a test subject and a material tester.

Description of Related Art

In order to evaluate the characteristics of materials, various material tests according to types and properties of materials are performed. A material tester executing a material test includes a load mechanism that applies a test force to a test piece that is a testing target and a force detector that is used for detecting a force applied to the test piece in the execution thereof (see Patent Documents 1 and 2).

[Patent Document 1] Japanese Laid-Open No. 2004-333221

[Patent Document 2] Japanese Laid-Open No. 2004-333143

In a high-speed tension test or a punching test, there are cases in which an impact of breakage or destruction of a test piece reaches the whole tester (a system including a jig and a force detector), and an amplitude according to a natural vibration of a defective tester main body is superimposed on a waveform of test data based on detection performed by the force detector. Particularly, in a case in which an excessive amplitude according to a natural vibration is superimposed on test data before a test piece breaks after starting of a test, the waveform represents a force that is actually applied to the test piece, and thus the reliability of a test result is degraded.

FIG. 9 is a test force—time graph illustrating a technique for determining the amplitude of a natural vibration superimposed on data between a test starting point and a breaking point from test data of a conventional high-speed tension test. In the graph illustrated in FIG. 9, the vertical axis represents a test force (kilonewtons (KN)), and the horizontal axis represents time (milliseconds (ms)).

From a viewpoint of the reliability of a test, it is necessary to determine a degree of the amplitude of a natural vibration superimposed on test data. When a high-speed tension test (for example, a test speed of 20 m/s) is executed, test data determined by a force detector is collected for a predetermined time period including before and after a time at which a test force is actually applied to a test piece. As illustrated in FIG. 9, test data detected by the force detector can be divided into three data periods A, B, and C including A: before a starting point of a test at which a test force starts to be applied to a test piece, B: between the starting point of the test and a breaking point at which the test piece breaks in a state in which a test force is applied to the test piece, and C: after the breaking point of the test piece. A data period used for evaluating material characteristics is the data period B. Conventionally, in order for a user to acquire the amplitude of a natural vibration superimposed in the data period B, the user extracts raw data stored in a storage device of a material tester which is a result of the test, prints a test force-time graph as illustrated in FIG. 9, manually draws straight lines on the upper and lower sides of a waveform of the data period B on the printed graph, and computes a degree of the amplitude from the width thereof through a visual observation. In such a case, since the estimation depends on a user's individual determination, individual differences in determination occur, and time and effort is taken to retrieve data and do manual work such as filling out the printed matter.

FIG. 10 is a graph illustrating the amplitude of a natural vibration and the amplitude of test data between a test starting point to a breaking point of a high-speed tension test that are acquired through a Fourier transform and illustrates a time axis of a data period in which there is a state in which a test force is being applied to a test piece (the data period B illustrated in FIG. 9) in an enlarged scale. FIG. 11 is a graph acquired by performing a Fourier transform on the waveform of the test force illustrated in FIG. 10. In the graph represented in FIG. 10, the vertical axis represents a test force (kilonewtons (kN)), and the horizontal axis represents a time (milliseconds (ms)). In the graph represented in FIG. 11, the vertical axis represents an amplitude, and the horizontal axis represents a frequency (kilohertz (kHz)).

By performing a Fourier transform of the test data illustrated in FIG. 10, a frequency spectrum illustrated in FIG. 11 is acquired. In FIG. 11, the amplitude at a frequency at which a maximum peak is formed is 0.34. In other words, a frequency at which a maximum peak value is formed through a Fourier transform is set as a natural vibration frequency, and an amplitude of a test force at this time is set as the amplitude of the natural vibration. According to this technique, compared to the technique described with reference to FIG. 9, there is less manual operation, and thus, it is difficult for an individual difference between users to occur. However, as denoted by a broken line in FIG. 10, while the amplitude of a natural vibration acquired through the Fourier transform is 0.34 (kN), a maximum amplitude of actual data, as denoted by a thick line in FIG. 10, is 0.7 (kN). According to a Fourier transform, time information disappears, and information for each frequency is formed. Thus, it is difficult to acquire an expected maximum value of the amplitude of the natural vibration (an amplitude 0.7 in the example illustrated in FIG. 10) from a result of the Fourier transform. Although a peak at one point is acquired in the frequency axis in FIG. 11, as a result of a Fourier transform, in a case in which a plurality of peaks having a certain width appears, it is difficult to determine a natural vibration frequency, and it is more difficult to acquire an amplitude.

SUMMARY

A disclosure according to a first aspect of the disclosure is an amplitude detecting method of detecting an amplitude of a natural vibration superimposed on test data based on a signal detected by a force detector in a material test applying a test force to a test subject by driving a load mechanism. The amplitude detecting method includes: a maximum value/minimum value calculating process of acquiring a maximum value and a minimum value of the natural vibration superimposed on the test data in data of a time period in which there is a state in which the test force is applied to the test subject in the test data; and an amplitude determining process of determining an amplitude of a natural vibration on the basis of a difference between the maximum value and the minimum value acquired in the maximum value/minimum value calculating process.

A disclosure according to a sixth aspect of the disclosure is a material tester including a control device that processes a signal detected by a force detector in a material test in which a test force is applied to a test subject by driving a load mechanism, wherein the control device includes an amplitude detecting part including: a maximum value/minimum value calculating part acquiring a maximum value and a minimum value of the natural vibration superimposed on test data in data of a time period that is in a state in which the test force is applied to the test subject in the test data based on the signal detected by the force detector; and an amplitude determining part determining an amplitude of a natural vibration on the basis of a difference between the maximum value and the minimum value acquired by the maximum value/minimum value calculating part.

DESCRIPTION OF THE EMBODIMENTS

Figure 1:
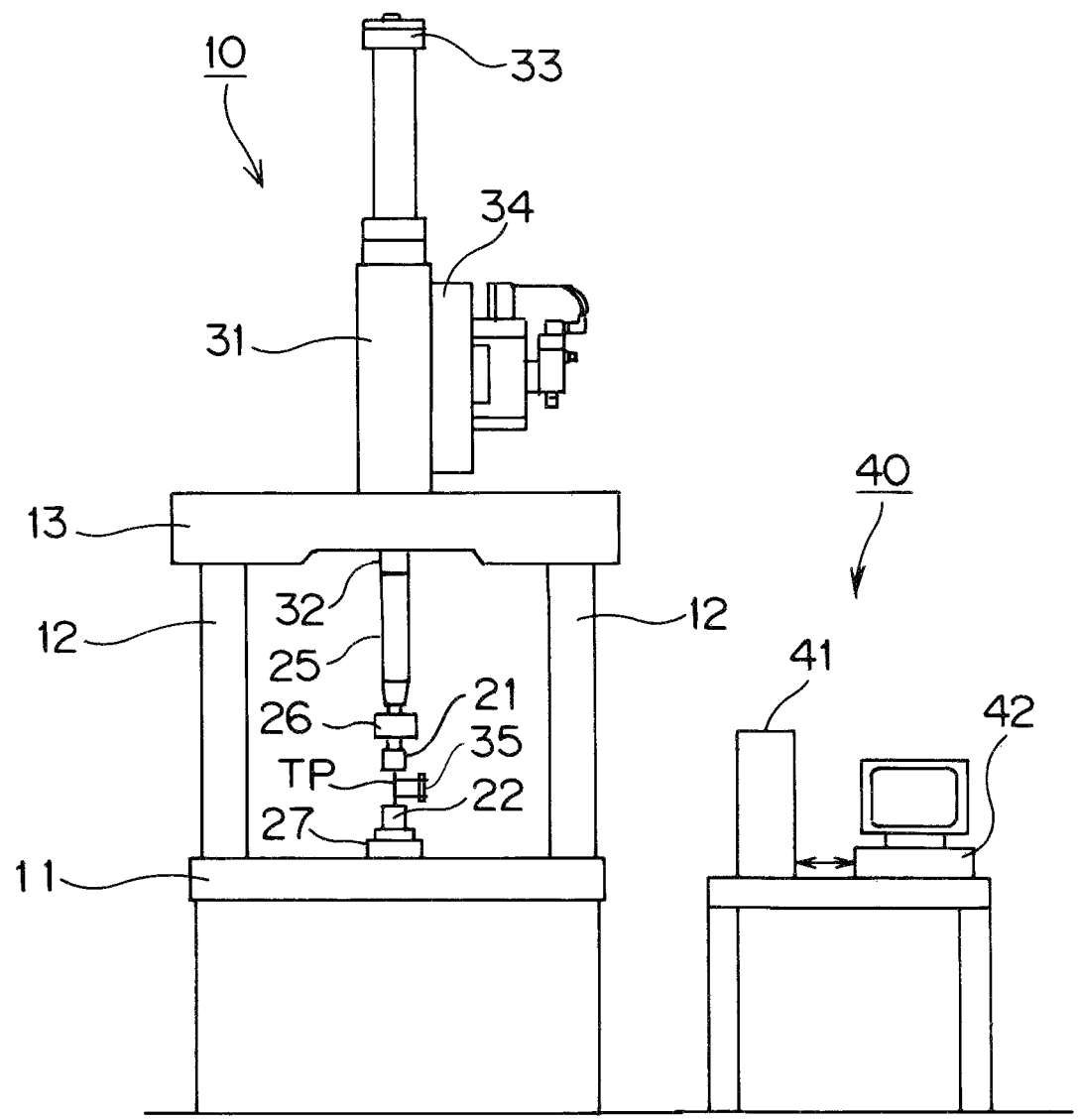
FIG. 1 is a diagram illustrating an overview of a material tester according to the disclosure.

The disclosure provides an amplitude detecting method and a material tester capable of quantitatively acquiring the amplitude of a natural vibration superimposed on test data.

A disclosure according to a second aspect of the disclosure, is the amplitude detecting method according to the first aspect of the disclosure, further including a period determining process of acquiring one period of a waveform of the natural vibration from the reciprocal of a frequency of the natural vibration superimposed on the test data, wherein, in the maximum value/minimum value calculating process, the maximum value and the minimum value are acquired in units of a time interval of one period acquired in the period determining process.

A disclosure according to a third aspect of the disclosure, in the amplitude detecting method according to the first aspect of the disclosure, further includes: a vibration noise eliminating process of eliminating the natural vibration superimposed on the test data from the test data; and a subtraction process of subtracting vibration noise-eliminated data acquired in the vibration noise eliminating process from the test data in a time period that is in a state in which the test force is applied to the test subject, wherein, in the maximum value/minimum value calculating process, a maximum value and a minimum value of subtraction data acquired in the subtraction process are acquired.

A disclosure according to a fourth aspect of the disclosure, in the amplitude detecting method according to any one of the first aspect to the third aspect of the disclosure, further includes a natural vibration frequency calculating process of acquiring a frequency of the natural vibration from the test data.

A disclosure according to a fifth aspect of the disclosure, in the amplitude detecting method according to any one of the first aspect to the third aspect of the disclosure, further includes a measurement noise eliminating process of eliminating measurement noise of the force detector, wherein measurement noise-eliminated data from which measurement noise has been eliminated in the measurement noise eliminating process is used as the test data.

According to a disclosure according to a seventh aspect of the disclosure, in the material tester according to the sixth aspect of the disclosure, the amplitude detecting part further includes a period determining part acquiring one period of a waveform of the natural vibration from the reciprocal of a frequency of the natural vibration superimposed on the test data, and the maximum value/minimum value calculating part acquires the maximum value and the minimum value in units of a time interval of one period acquired by the period determining part.

According to a disclosure according to an eighth aspect of the disclosure, in the material tester according to the sixth aspect of the disclosure, the control device further includes a vibration noise eliminating part eliminating the natural vibration superimposed on the test data from the test data, the amplitude detecting part further includes a subtraction part subtracting vibration noise-eliminated data acquired by the vibration noise eliminating part from the test data in a time period that is in a state in which the test force is applied to the test subject, and the maximum value/minimum value calculating part acquires a maximum value and a minimum value of subtraction data acquired by the subtraction part.

According to a disclosure according to a ninth aspect of the disclosure, in the material tester according to any one of the sixth aspect to the eighth aspect of the disclosure, the control device further includes a natural vibration frequency calculating part acquiring a frequency of the natural vibration from the test data.

According to a disclosure according to the tenth aspect of the disclosure, in the material tester according to any one of the sixth aspect to the eighth aspect of the disclosure, the amplitude detecting part further includes a measurement noise eliminating part eliminating measurement noise of the force detector, and measurement noise-eliminated data from which measurement noise has been eliminated by the measurement noise eliminating part is used as the test data.

According to the disclosures described in the first aspect to the tenth aspect of the disclosure, from data of a time period that is in a state in which the test force is applied to the test subject in test data, the amplitude of the natural vibration superimposed in the data is detected, whereby the amplitude of the natural vibration superimposed on the test data can be quantitatively acquired. In this way, information used for objectively evaluating the reliability of a test can be provided for a user.

According to the disclosures described in the fourth aspect and the ninth aspect of the disclosure, a frequency of a natural vibration can be acquired from the test data, and thus, amplitude detection using the frequency of the natural vibration can be executed without checking a vibration frequency of the natural vibration of a system including the force detector of the tester main body and the jig using another vibration detecting device in advance.

Figure 2:
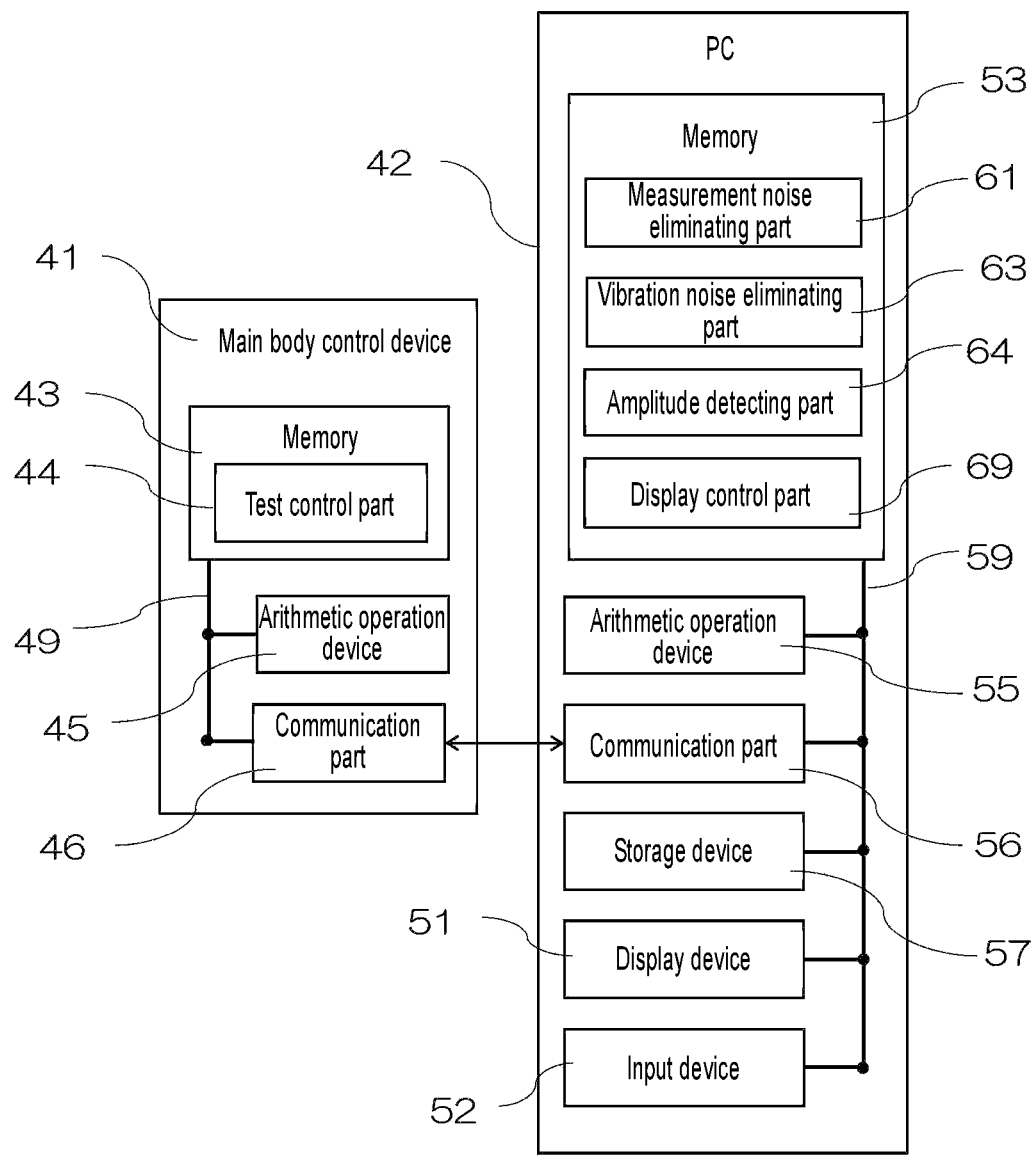
FIG. 2 is a block diagram illustrating a main control system of a material tester according to the disclosure.

Hereinafter, embodiments of the disclosure will be described with reference to the drawings. FIG. 1 is a diagram illustrating an overview of a material tester according to the disclosure. FIG. 2 is a block diagram illustrating a main control system of the material tester according to the disclosure.

This material tester executes a high-speed tension test of rapidly applying a shocking tensile force to a test piece TP and includes a tester main body 10 and a control device 40. The tester main body 10 includes a table 11, one pair of support posts 12 erected on the table 11, a cross yoke 13 stretched over the one pair of support posts 12, and a hydraulic cylinder 31 fixed to the cross yoke 13.

The hydraulic cylinder 31 is connected to a hydraulic power source (not illustrated in the drawing) disposed inside the table 11 through a servo valve 34 and operates in accordance with a hydraulic oil supplied from the hydraulic power source. An upper chuck 21 is connected to a piston rod 32 of the hydraulic cylinder 31 through a run-up jig 25 and a joint 26. Meanwhile, a lower chuck 22 is connected to the table 11 through a load cell 27 that is a force detector. In this way, the configuration of this tester main body 10 is a configuration for executing a tension test for rapidly separating one pair of chucks, which grip both end portions of the test piece TP, away from each other by disposing a run-up section in a pulling direction using the run-up jig 25 and lifting a piston rod 32 at a high speed of 0.1 to 20 m/s. A displacement (stroke) of a load mechanism at the time of execution of a tension test, in other words, a moving amount of the piston rod 32 is detected by a stroke sensor 33, and a test force at that time is detected by the load cell 27.

In addition, an extensometer 35 is disposed on the test piece TP. The extensometer 35 is directly attached to a test piece TP for measuring the expansion of the test piece TP and, for example, has a structure as disclosed in Japanese Unexamined Patent Application Publication No. 2006-10409. In other words, fixing tools respectively fixed to marked lines at two positions set on the test piece TP, a pipe formed from a conductor fixed to one fixing tool, and a coil inserted into the inside of a pipe fixed to the other fixing tool to be movable are included, and a change in inductance of a coil based on a change in the amount of insertion of the coil with respect to the pipe is detected, and an expansion of the test piece TP between the marked lines is measured. In addition, for detection of a displacement occurring in a test subject, a signal of the stroke sensor 33 may be used, or the displacement may be measured using a non-contact type extensometer such as a high-speed video camera.

The control device 40 is composed of a main body control device 41 used for controlling the operation of the tester main body 10 and a personal computer 42. The main body control device 41 includes a memory 43 that stores a program, an arithmetic operation device 45 such as a micro processing unit (MPU) that executes various arithmetic operations, and a communication part 46 that communicates with the personal computer 42. The memory 43, the arithmetic operation device 45, and the communication part 46 are interconnected through a bus 49. In addition, the main body control device 41 includes a test control part 44 as a functional component. The test control part 44 is stored in the memory 43 as a test control program. In a case in which a high-speed tension test is executed, by executing the test control program, a control signal is supplied to the servo valve 34, and the hydraulic cylinder 31 operates. Signal input/output parts respectively corresponding to the load cell 27, the stroke sensor 33, and the extensometer 35 are disposed in the main body control device 41, and an output signal of the load cell 27, an output signal of the stroke sensor 33, and an output signal of the extensometer 35 are digitalized and are taken in by the main body control device 41 over predetermined time intervals.

The personal computer 42 includes a ROM that stores a data analysis program, a memory 53 formed by a RAM that loads a program and temporarily stores data at the time of execution of a program and the like, an arithmetic operation device 55 such as a central processing unit (CPU) executing various arithmetic operations, a communication part 56 that communicates with an externally-connected device such as the main body control device 41, a storage device 57 that stores data, a display device 51 on which a test result is displayed, and an input device 52 that is used for inputting test conditions. A program realizing a function by operating the arithmetic operation device 55 is stored in the memory 53. In addition, the storage device 57 is configured as a large-capacity storage device such as a hard disk drive (HDD) and stores time series data that is a raw data of a test force input from the load cell 27 and the like. The memory 53, the arithmetic operation device 55, the communication part 56, the storage device 57, the display device 51, and the input device 52 are interconnected through a bus 59.

In FIG. 2, programs that are installed in the personal computer 42 and are stored in the memory 53 are illustrated as functional blocks. In this embodiment, a measurement noise eliminating part 61 that eliminates measurement noise originating from a detector such as electrical fluctuation of detectors of the load cell 27 and the extensometer 35, a vibration noise eliminating part 63 that eliminates vibration noise assumed to be caused by an inertial force according to natural vibration applied to the entire tester due to the impact of breakage or destruction of the test piece, an amplitude detecting part 64 that detects the amplitude of a natural vibration superimposed in the data period used for evaluating material characteristics, and a display control part 69 that controls display of an amplitude value of the natural vibration and a test result on the display device 51 are provided as functional blocks.

Figure 3:
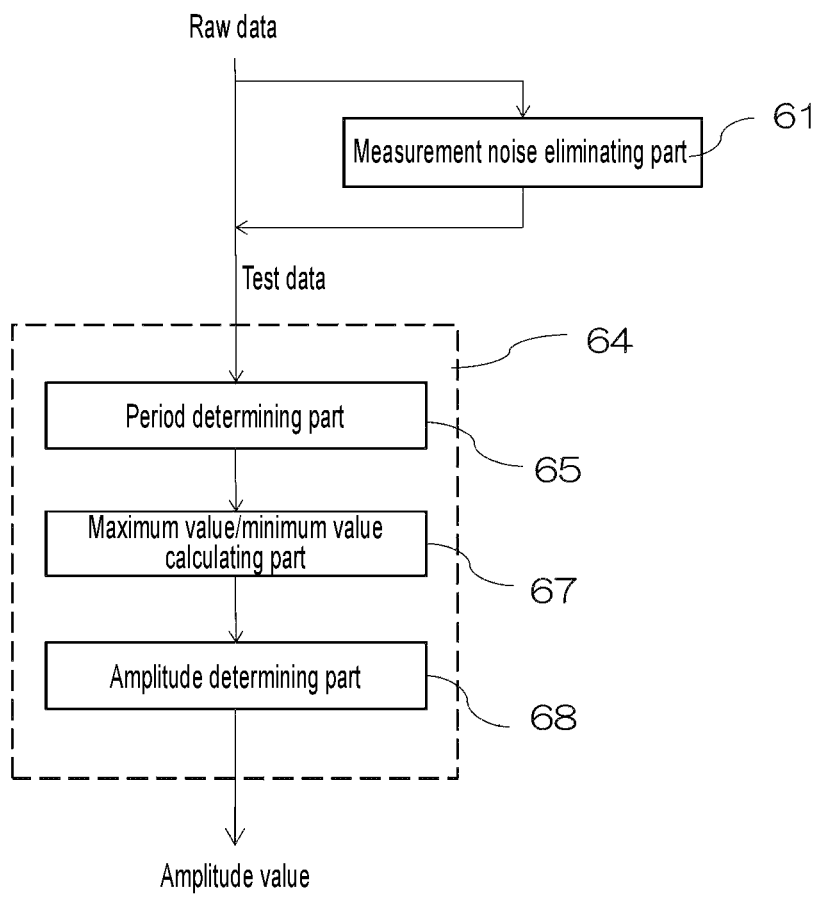
FIG. 3 is a flowchart illustrating an amplitude detecting method according to a first embodiment.
Figure 4:
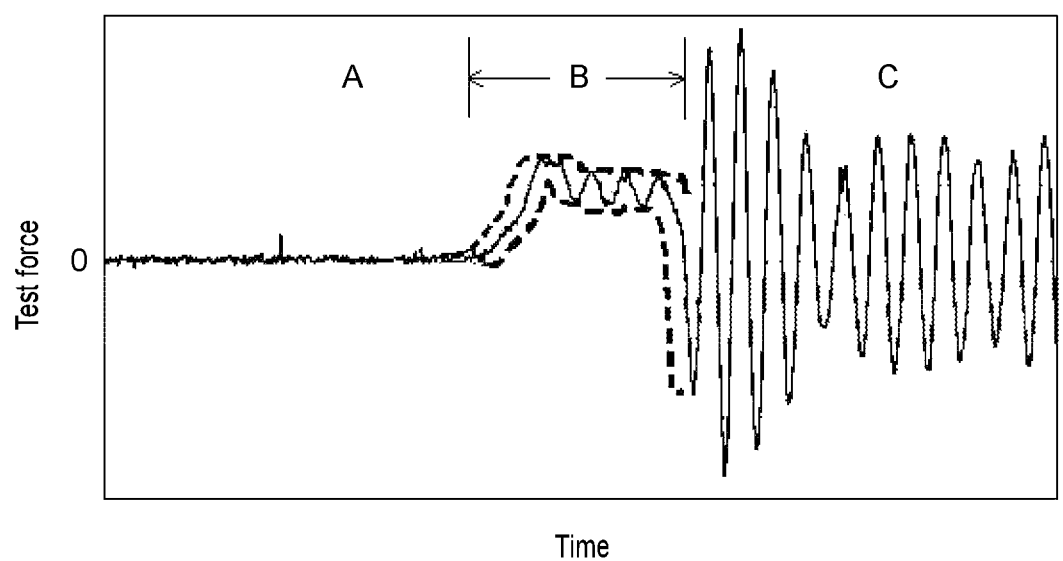
FIG. 4 is a test force—time graph illustrating an amplitude detecting method according to the first embodiment.

An amplitude detecting method according to the disclosure acquiring an amplitude of a natural vibration from test data acquired when a high-speed tension test is executed using the material tester having such a configuration will be described. FIG. 3 is a flowchart illustrating an amplitude detecting method according to a first embodiment, and FIG. 4 is a test force-time graph. In the graph, the vertical axis represents a test force, and the horizontal axis represents a time.

When a high-speed tension test (for example, a test speed of 20 m/s) is executed, raw data, which is acquired using the load cell 27, corresponding to a predetermined time period including before and after a time at which a test force is actually applied to the test piece TP is collected at a predetermined sampling rate and is stored in the storage device 57 as time series data. In the graph illustrated in FIG. 4, although an example in which amplitude detection is executed directly using raw data as test data is illustrated, the test data used for amplitude detection may be data from which measurement noise has been eliminated by the measurement noise eliminating part 61. The measurement noise eliminating part 61 is configured as a noise cutoff filter causing a frequency of the measurement noise to disappear.

The test data can be divided into data of three time periods of A: before a starting point of a test at which a test force is started to be applied to a test piece, B: between the starting point of the test and a breaking point at which the test piece breaks in a state in which a test force is applied to the test piece, and C: after the breaking point of the test piece (see FIG. 4). Among the data periods A, B, and C, data that is mainly used for evaluating material characteristics is the data of the data period B, and thus, the amplitude detecting part 64 acquires the amplitude of a natural vibration superimposed on the test data of the data period B. In addition, the data period A can be used when a frequency of a measurement noise is acquired, and the data period C can be used for calculating vibration noise, in other words, a natural vibration frequency.

In this embodiment, the amplitude detecting part 64 includes a period determining part 65, a maximum value/minimum value calculating part 67, and an amplitude determining part 68. The amplitude detection in the data period B is realized by the arithmetic operation device 55 that reads programs from the period determining part 65, the maximum value/minimum value calculating part 67, and the amplitude determining part 68 of the amplitude detecting part 64 of the memory 53 and executes a period determining process, a maximum/minimum value calculating process, and an amplitude determining process.

When test data is input to the amplitude detecting part 64, the period determining part 65 acquires one period of the waveform of a natural vibration from the reciprocal of the natural vibration frequency. In this embodiment, as the frequency of a natural vibration, in a state in which a test is not executed, a frequency of the natural vibration acquired using another vibration detecting device not illustrated in the drawing by hitting the lower chuck 22 connected to the load cell 27 with a hammer or the like is stored in the storage device 57 in advance, and when the period determining process is executed, the frequency of the natural vibration is called from the storage device 57. In addition, a frequency of the natural vibration may be acquired by performing a Fourier transform using the data of the data period C (see FIG. 4) in which a large vibration according to an impact of breakage of a test piece TP appears.

When one period of the waveform of the natural vibration is acquired by the period determining part 65, the maximum value/minimum value calculating part 67 calculates a maximum value and a minimum value in a time interval while moving the time interval on the data of the data period B over predetermined time intervals with reference to a time interval of one period of the waveform of the natural vibration. Here, moving on the data of the data period B over predetermined time intervals, for example, represents that an operation of sliding a time interval on the data over an interval of five sampling points is repeated by assuming that there are 100 data points in the time interval of one period and an area for the calculation of a maximum value and a minimum value is moved with the time interval maintained. The maximum value and the minimum value acquired in this way are denoted by broken lines in FIG. 4.

The amplitude determining part 68 calculates a difference between the maximum value and the minimum value (the maximum value–the minimum value) denoted by the broken lines in FIG. 4. A value of the difference between the maximum value and the minimum value corresponds to a wave height of the waveform of the vibration having a natural cycle that is superimposed on the test data of the data period B, and a value that is ½ of this value is the amplitude of the natural vibration. An amplitude value determined by the amplitude determining part 68 in this way is displayed in the display device 51 in accordance with an operation of the display control part 69 and is provided for a user as information.

Figure 5:
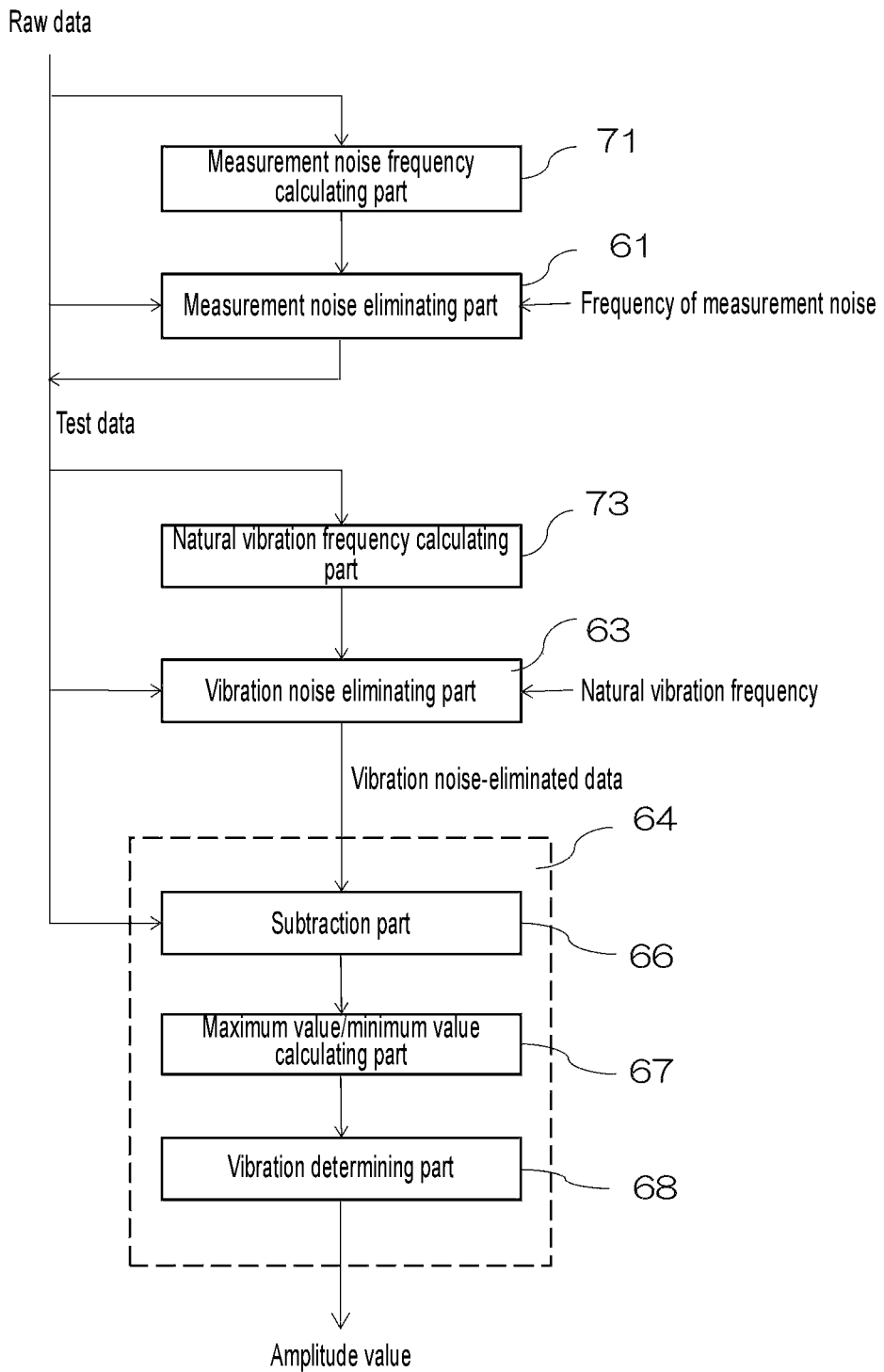
FIG. 5 is a flowchart illustrating an amplitude detecting method according to a second embodiment.
Figure 6:
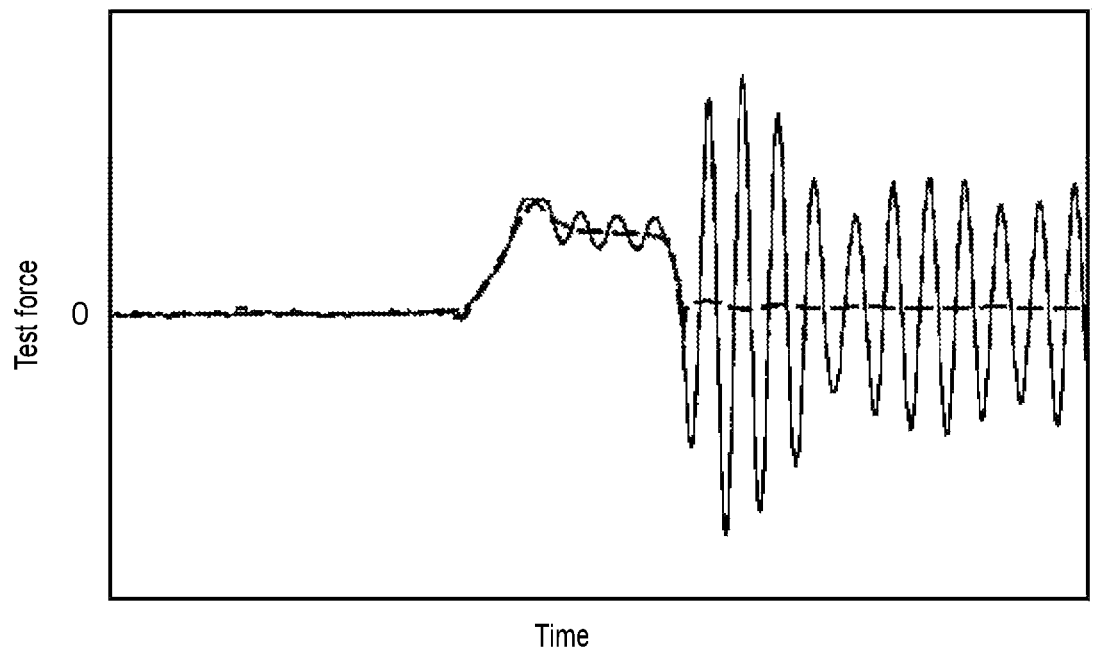
FIG. 6 is a test force—time graph illustrating an amplitude detecting method according to the second embodiment.
Figure 7:
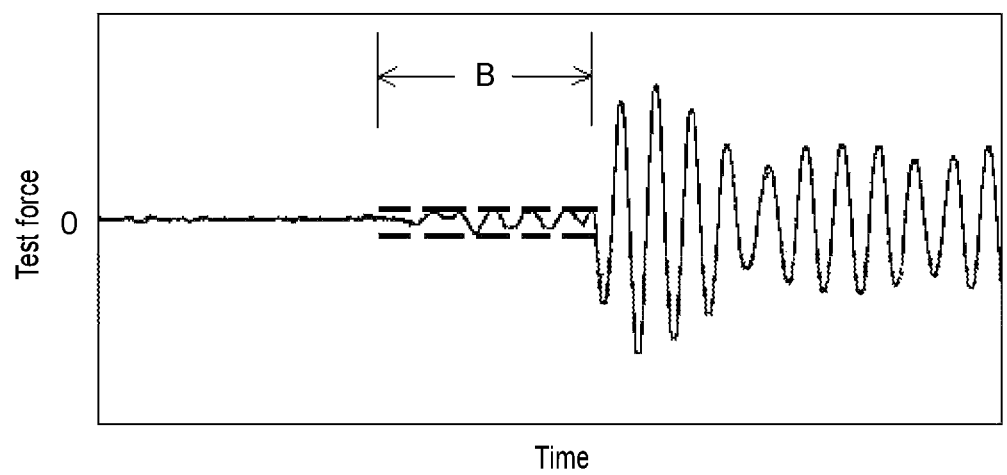
FIG. 7 is a test force—time graph illustrating an amplitude detecting method according to the second embodiment.
Figure 8:
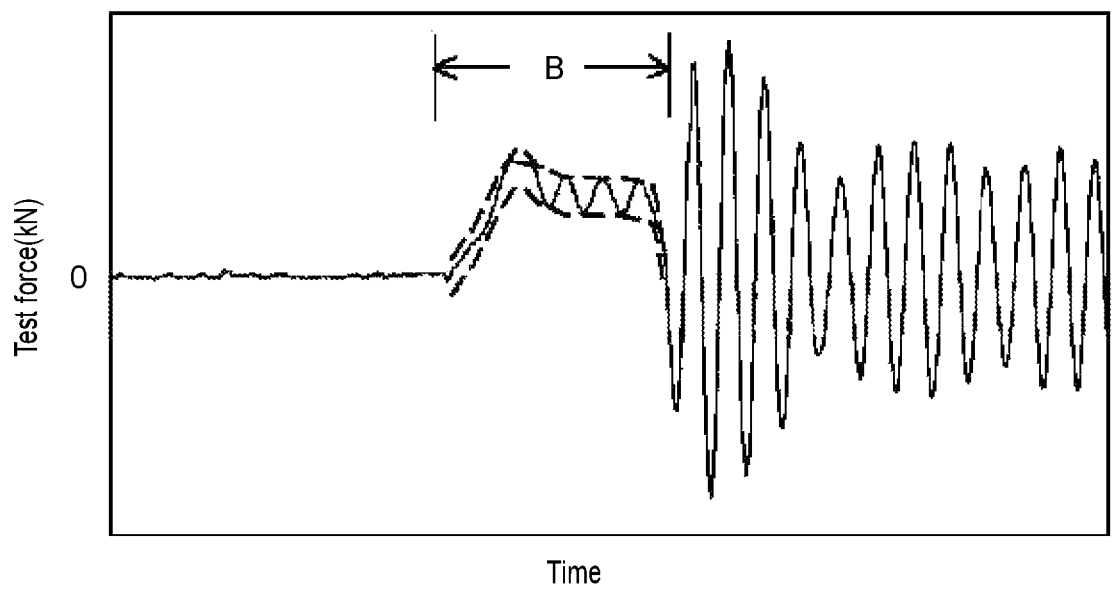
FIG. 8 is a test force—time graph illustrating an amplitude detecting method according to the second embodiment.
Figure 9:
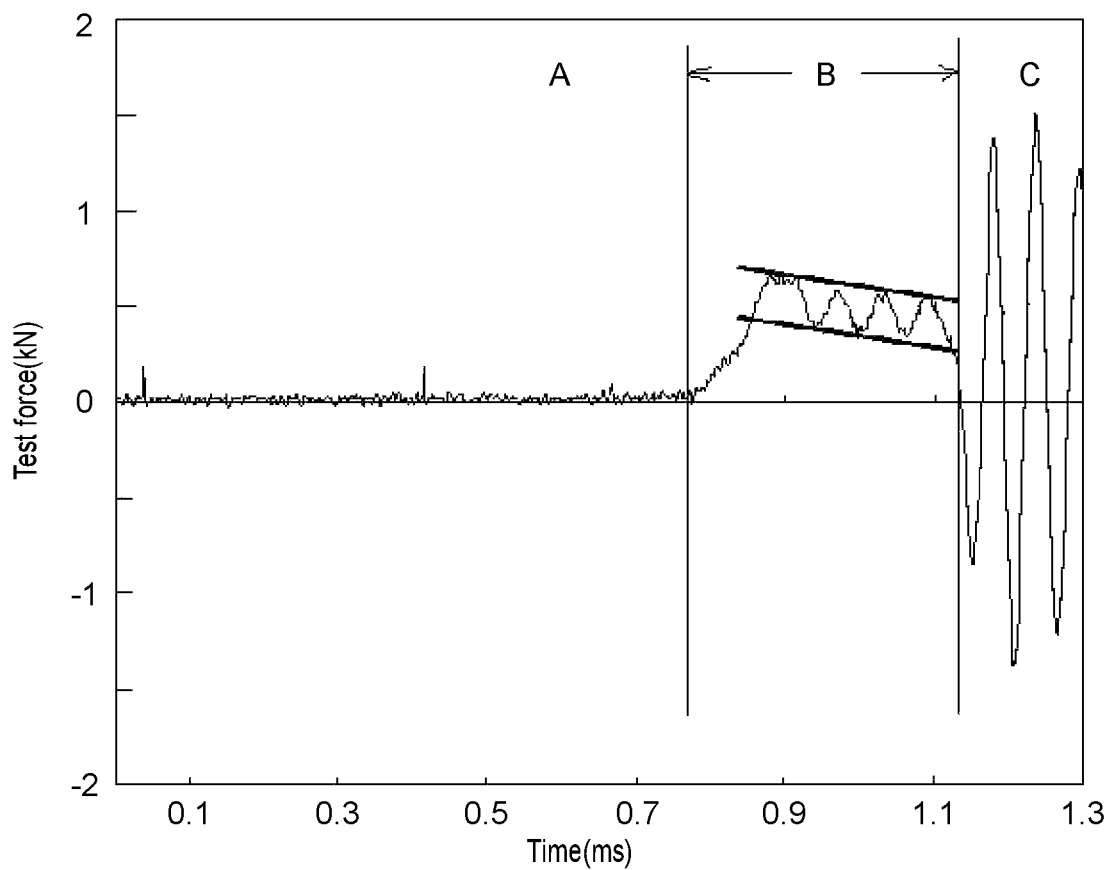
FIG. 9 is a test force—time graph illustrating a technique for acquiring the amplitude of a natural vibration superimposed on data from a starting point to a breaking point of a test from test data of a conventional high-speed tension test.
Figure 10:
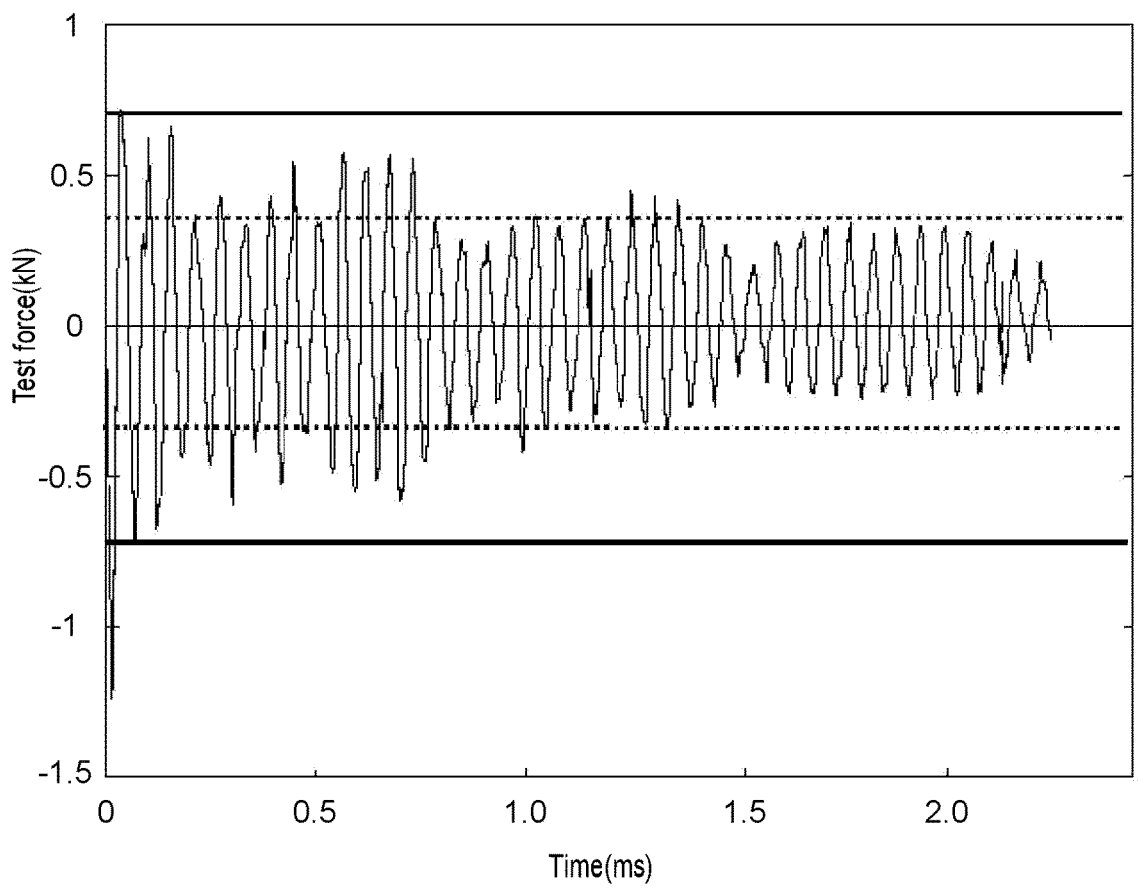
FIG. 10 is a graph illustrating the amplitude of a natural vibration and the amplitude of test data between a test starting point and a breaking point of a high-speed tension test that are acquired through a Fourier transform.
Figure 11:
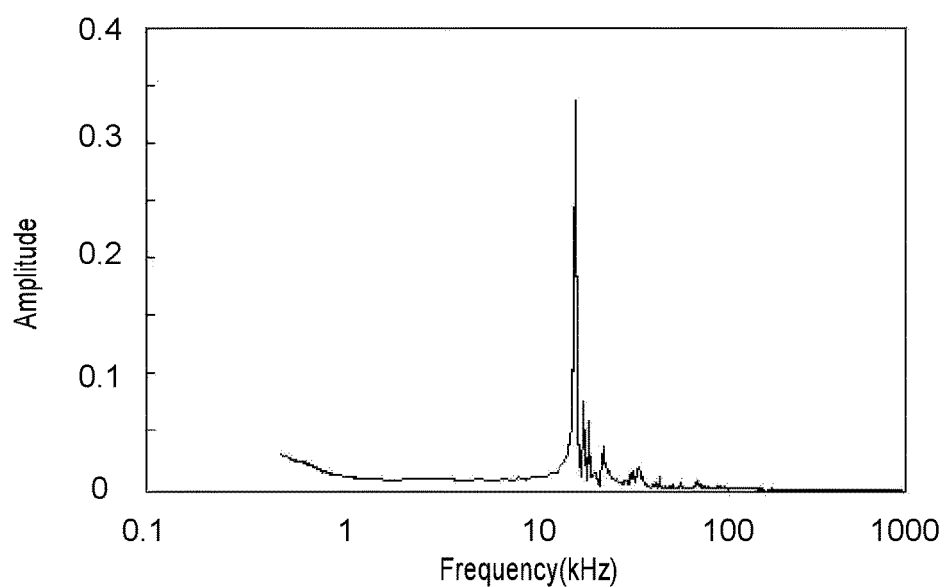
FIG. 11 is a graph acquired by performing a Fourier transform of the waveform illustrated in FIG. 10.

Next, another amplitude detecting method will be described. FIG. 5 is a flowchart illustrating an amplitude detecting method according to a second embodiment, and FIGS. 6 to 8 are test force-time graphs. In the graphs, the vertical axis represents a test force, and the horizontal axis represents a time.

In the graph illustrated in FIG. 4 referred to in the description of the first embodiment, although an example in which amplitude detection is executed directly using raw data as test data is illustrated, in the graphs illustrated in FIGS. 6 to 8, examples in which test data used for amplitude detection is measurement noise-eliminated data from which measurement noise has been eliminated by the measurement noise eliminating part 61 are illustrated. In the measurement noise eliminating part 61, a noise cutoff filter is configured on the basis of the frequency of the measurement noise. In addition, raw data from which measurement noise has not been eliminated may be directly used as test data.

The frequency of measurement noise may be acquired by an operation of the measurement noise frequency calculating part 71 using the raw data of the data period A before starting of a test that is illustrated in FIG. 4, or a frequency of measurement noise acquired using data collected for verification of the state of the load cell 27 before a test may be stored in the storage device 57 in advance and be read when a measurement noise eliminating process is executed by the measurement noise eliminating part 61. The measurement noise frequency calculating part 71 is a functional block representing a program executing a measurement noise frequency calculating process that is stored in the memory 53.

In this embodiment, in order to use vibration noise-eliminated data from which a natural vibration has been eliminated for amplitude detection, the arithmetic operation device 55 executes a vibration noise eliminating process in which a program is read from the vibration noise eliminating part 63 of the memory 53, and vibration noise-eliminated data is acquired by eliminating the natural vibration from the test data. In the graph illustrated in FIG. 6, test data is denoted by a solid line, and vibration noise-eliminated data is denoted by a broken line.

As the natural vibration frequency required for the vibration noise eliminating part 63, a natural vibration frequency acquired using the data period C (see FIG. 4) in which a large vibration according to an impact of breakage of a test piece TP appears in the test data in accordance with an operation of the natural vibration frequency calculating part 73 may be used, or a natural vibration frequency acquired by another vibration detecting device not illustrated in the drawing by hitting the lower chuck 22 connected to the load cell 27 with a hammer or the like in a state in which a test is not executed may be stored in the storage device 57 in advance and be called from the storage device 57 when a vibration noise eliminating process is executed. The natural vibration frequency calculating part 73 is a functional block representing a program executing the natural vibration frequency calculating process stored in the memory 53. In addition, data used for calculating the natural vibration frequency may be either raw data or data from which measurement noise has been eliminated.

In addition, as in this embodiment, by arranging the measurement noise frequency calculating part 71 and the natural vibration frequency calculating part 73 as functional blocks in the personal computer 42, both a frequency of measurement noise and a natural vibration frequency can be acquired from raw data illustrated in FIG. 4, in other words, data acquired through an actual test. Accordingly, also even in a case in which a natural frequency of a system including a force detector and a jig of a tester main body has not been checked in advance using another vibration detecting device, amplitude detection using the natural vibration frequency can be performed, and, even in a case in which measurement noise of a detector has not been checked in advance, an appropriate noise cutoff filter can be installed using a frequency of measurement noise acquired from data that has been acquired through a test.

In this embodiment, the amplitude detecting part 64 includes a subtraction part 66, a maximum value/minimum value calculating part 67, and the amplitude determining part 68. The amplitude detection in the data period B is realized by the arithmetic operation device 55 that reads programs from the subtraction part 66, the maximum value/minimum value calculating part 67, and the amplitude determining part 68 of the amplitude detecting part 64 of the memory 53 and executes a subtraction process, a maximum value/minimum value calculating process, and an amplitude determining process.

When the test data and the vibration noise-eliminated data are input to the amplitude detecting part 64, the subtraction part 66 subtracts the vibration noise-eliminated data from the test data in the data period B. Then, the test data in the data period B, as illustrated in FIG. 7, is converted into a waveform having an amplitude of a uniform width above and below a test force of zero at the center.

The maximum value/minimum value calculating part 67 acquires a maximum value and a minimum value of the subtraction data of the data period B acquired by an operation of the subtraction part 66. In the graph illustrated in FIG. 7, maximum values and minimum values acquired by an operation of the maximum value/minimum value calculating part 67 are denoted by broken lines.

The amplitude determining part 68 calculates a difference between the maximum value and the minimum value denoted by broken lines in FIG. 7 (the maximum value–the minimum value). A value of the difference between the maximum value and the minimum value corresponds to a wave height of the vibration waveform having a natural cycle that is superimposed on the test data of the data period B, and a value that is ½ of this value is an amplitude of the natural vibration. The amplitude value determined by the amplitude determining part 68 in this way is displayed in the display device 51 in accordance with an operation of the display control part 69 and is provided for a user as information.

By adding the vibration noise-eliminated data of the data period B to a maximum value and a minimum value of the data period B denoted by broken lines in the graph illustrated in FIG. 7, a graph illustrated in FIG. 8 is formed. In addition to displaying an amplitude value determined by the amplitude determining part 68 in the display device 51 as a numerical value, maximum values and minimum values acquired by the maximum value/minimum value calculating part 67 may be used for drawing auxiliary lines representing upper and lower sides of the amplitude in the waveform of the test data.

As described above, according to the amplitude detecting method of the disclosure, it is possible to quantitatively determine the amplitude of a natural vibration applied to the test piece TP superimposed on a test force set for a test independently of visual observation of a user.

In the embodiment described above, although a high-speed tension test has been described, the disclosure can be applied for checking a force according to resonance having a likelihood of being applied to a test subject with being superimposed on a test force set in a test such as a high-speed compression test in which a compressive load is applied to a test body such as concrete.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An amplitude detecting method of detecting an amplitude of a natural vibration of a tester main body superimposed on test data based on a signal detected by a force detector in a material test applying a test force to a test subject by driving a load mechanism, the amplitude detecting method comprising:

a period determining process of determining one period of a waveform of the natural vibration of the tester main body from a reciprocal of a frequency of the natural vibration of the tester main body superimposed on the test data, wherein the frequency of the natural vibration of the tester main body is acquired using test data from a time interval occurring after a vibration according to an impact of breakage of a test piece appears in the test data;

a maximum value/minimum value calculating process of acquiring a maximum amplitude value and a minimum amplitude value of the natural vibration of the tester main body superimposed on the test data occurring while the test force is applied to the test subject;

wherein, in the maximum value/minimum value calculating process, the maximum amplitude value and the minimum amplitude value are acquired in a time interval equivalent to one period of the waveform of the natural vibration of the tester main body acquired in the period determining process; and an amplitude determining process of determining the amplitude of the natural vibration of the tester main body on a basis of a difference between the maximum amplitude value and the minimum amplitude value acquired in the maximum value/minimum value calculating process.

2. The amplitude detecting method according to claim 1, further comprising:

a vibration noise eliminating process of eliminating the natural vibration of the tester main body superimposed on the test data from the test data; and a subtraction process of subtracting vibration noise-eliminated data acquired in the vibration noise eliminating process from the test data in a time period that is in a state in which the test force is applied to the test subject, wherein, in the maximum value/minimum value calculating process, a maximum amplitude value and a minimum amplitude value of subtraction data acquired in the subtraction process are acquired.

3. The amplitude detecting method according to claim 2, further comprising:

a measurement noise eliminating process of eliminating measurement noise of the force detector, wherein measurement noise-eliminated data from which measurement noise has been eliminated in the measurement noise eliminating process is used as the test data.

4. The amplitude detecting method according to claim 1, further comprising:

a measurement noise eliminating process of eliminating measurement noise of the force detector, wherein measurement noise-eliminated data from which measurement noise has been eliminated in the measurement noise eliminating process is used as the test data.

5. A material tester comprising computer that processes a signal detected by a force detector in a material test in which a test force is applied to a test subject by driving a load mechanism, wherein the computer comprises a processor configured to:

acquire one period of a waveform of a natural vibration of a tester main body from a reciprocal of a frequency of the natural vibration of the tester main body superimposed on test data, wherein the frequency of the natural vibration of the tester main body is acquired using test data from a time interval occurring after a vibration according to an impact of breakage of a test piece appears in the test data;

acquire a maximum amplitude value and a minimum amplitude value of the natural vibration of the tester main body superimposed on test data occurring while the test force is applied to the test subject based on the signal detected by the force detector;

wherein the maximum amplitude value and the minimum amplitude value are acquired in a time interval equivalent to one period of the waveform of the natural vibration of the tester main body acquired by the processor; and determine an amplitude of the natural vibration of the tester main body on a basis of a difference between the maximum amplitude value and the minimum amplitude value.

6. The material tester according to claim 5, wherein the processor further configured to eliminate the natural vibration of the tester main body superimposed on the test data from the test data, wherein the processor further configured to subtract vibration noise-eliminated data acquired by the processor from the test data in a time period that is in a state in which the test force is applied to the test subject, and wherein the processor further configured to acquire a maximum amplitude value and a minimum amplitude value of subtraction data acquired by the processor.

7. The material tester according to claim 6, wherein the processor further configured to eliminate measurement noise of the force detector, and wherein measurement noise-eliminated data from which measurement noise has been eliminated is used as the test data.

8. The material tester according to claim 5, wherein the processor further configured to eliminate measurement noise of the force detector, and wherein measurement noise-eliminated data from which measurement noise has been eliminated is used as the test data.

9. An amplitude detecting method of detecting an amplitude of a natural vibration of a tester main body superimposed on test data based on a signal detected by a force detector in a material test applying a test force to a test subject by driving a load mechanism, the amplitude detecting method comprising:

a period determining process of determining one period of a waveform of the natural vibration of the tester main body from a reciprocal of a frequency of the natural vibration of the tester main body superimposed on the test data, wherein the tester main body comprises a lower chuck connected to the tester main body, the frequency of the natural vibration of the tester main body is acquired by hitting the lower chuck connected to the force detector and detecting a vibration frequency of the tester main body in a state in which the material test is not executed;

a maximum value/minimum value calculating process of acquiring a maximum amplitude value and a minimum amplitude value of the natural vibration of the tester main body superimposed on the test data occurring while the test force is applied to the test subject;

wherein, in the maximum value/minimum value calculating process, the maximum amplitude value and the minimum amplitude value are acquired in a time interval equivalent to one period of the waveform of the natural vibration of the tester main body acquired in the period determining process; and an amplitude determining process of determining the amplitude of the natural vibration of the tester main body on a basis of a difference between the maximum amplitude value and the minimum amplitude value acquired in the maximum value/minimum value calculating process.

10. A material tester comprising computer that processes a signal detected by a force detector in a material test in which a test force is applied to a test subject by driving a load mechanism, wherein the computer comprises a processor configured to:

acquire one period of a waveform of a natural vibration of a tester main body from a reciprocal of a frequency of the natural vibration of the tester main body superimposed on test data, wherein the tester main body comprises a lower chuck connected to the tester main body, the frequency of the natural vibration of the tester main body is acquired by hitting the lower chuck connected to the force detector and detecting a vibration frequency of the tester main body in a state in which the material test is not executed;

acquire a maximum amplitude value and a minimum amplitude value of the natural vibration of the tester main body superimposed on test data occurring while the test force is applied to the test subject based on the signal detected by the force detector;

wherein the maximum amplitude value and the minimum amplitude value are acquired in a time interval equivalent to one period of the waveform of the natural vibration of the tester main body acquired by the processor; and determine an amplitude of the natural vibration of the tester main body on a basis of a difference between the maximum amplitude value and the minimum amplitude value.

* * * * *